Jan. 23, 1934.     G. R. ERICSON     1,944,550
FILTERING SYSTEM
Filed Feb. 26, 1932     2 Sheets-Sheet 1

GEORGE R. ERICSON
INVENTOR

BY *J. H. Gibbs*
ATTORNEY

Jan. 23, 1934.    G. R. ERICSON    1,944,550
FILTERING SYSTEM
Filed Feb. 26, 1932    2 Sheets-Sheet 2
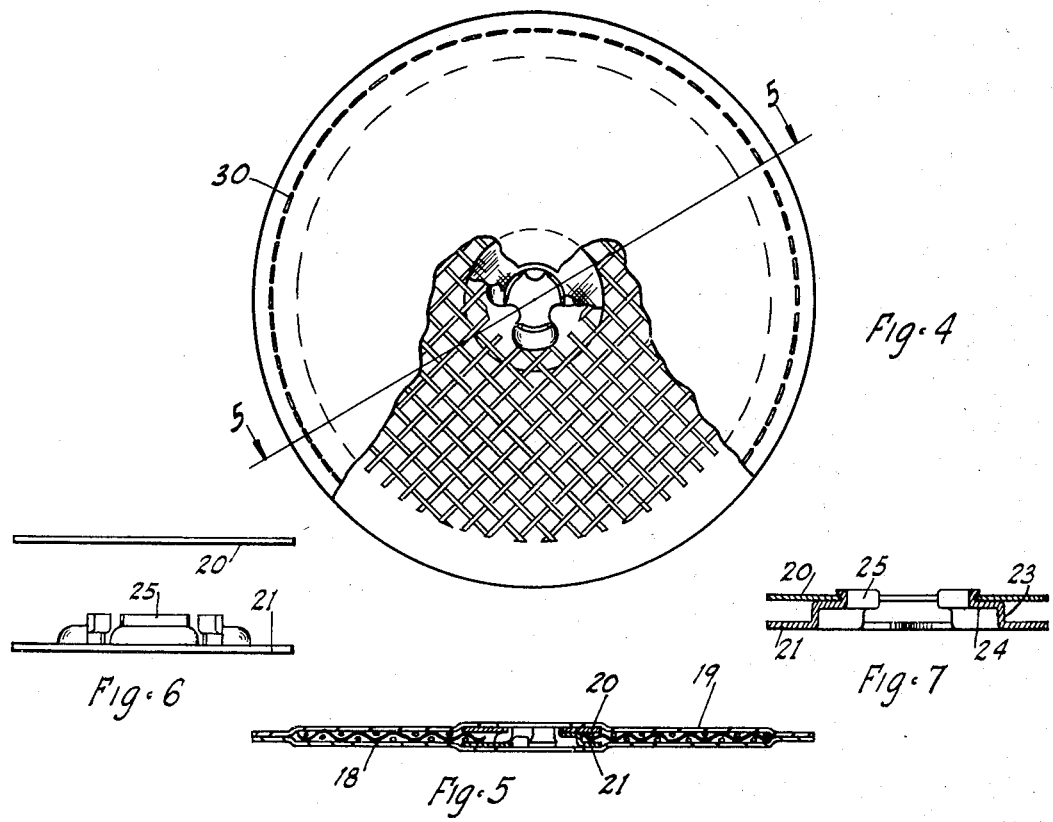
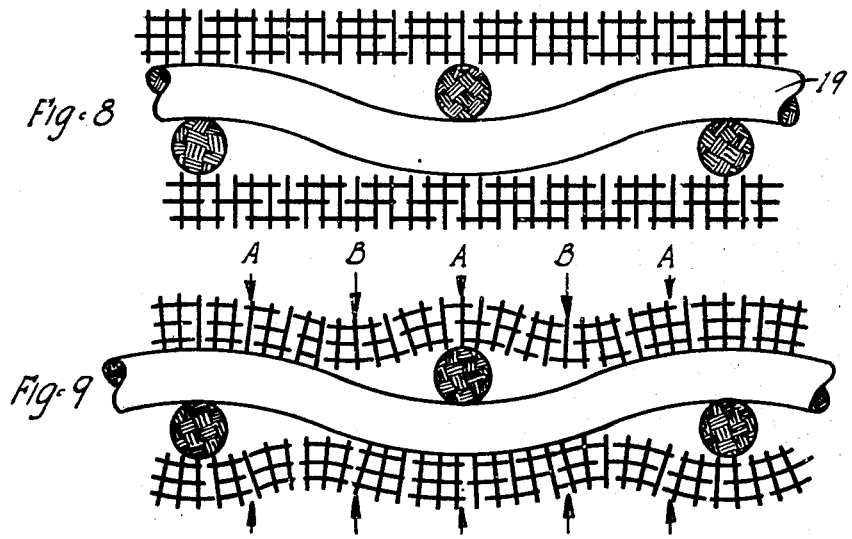
GEORGE R. ERICSON
INVENTOR
BY
ATTORNEY Patented Jan. 23, 1934

1,944,550

UNITED STATES PATENT OFFICE 1,944,550

FILTERING SYSTEM

George R. Ericson, Maplewood, Mo., assignor to Carter Carburetor Corporation, St. Louis, Mo., a corporation of Delaware Application February 26, 1932. Serial No. 595,300

14 Claims. (Cl. 210—181)

This invention relates to filters, and particularly to oil filters for use in connection with automotive internal combustion engines. In previous filters of this type, difficulty has been encountered on account of the fact that the filter element had to be made of comparatively coarse mesh, otherwise, it would clog up so quickly as to render the device impractical for automotive use. Paper filters had been used, but they were unsatisfactory, because they clogged up too quickly, and also because the paper tended to become soft and useless as soon as a little dampness got into the oil. For the latter reason, paper filters were abandoned, and cloth filters were used. The cloth filter clogs up even more quickly than the paper filter of the same effective fineness of mesh, but on account of the fact that the cloth does not lose its tensile strength in the presence of damp oil, this type of filter is widely used for automotive purposes. The real difficulty with the cloth filter is that in order to avoid clogging, it must be made too coarse, and only the coarsest dirt is removed.

It is an object of this invention to provide a filter of fine mesh capable of accumulating a large amount of solid matter before the filter becomes clogged.

It is a further object of this invention to provide a fine meshed filter capable of maintaining its capacity during a much longer period of use than previous filters.

It is a further object of this invention to provide a filter having a filtering element of such fine texture as to be capable of filtering the impurities from internal combustion engine oil prior to the accumulation of any substantial slime bed on the surface thereof.

It is a further object of this invention to produce a filter having a filtering element capable of breaking up the slime bed of carbon particles as fast as it forms, until such a thickness of the slime bed is built up as to practically fill the filter casing and render the filter unfit for further use.

It is a further object of this invention to construct a filter having a filtering element capable of filtering out the finest particles of carbon from lubricating oil so as to keep the oil in a visibly clean and clear condition.

It is a further object of this invention to provide a filter of simple and inexpensive construction.

A further object of the invention is to provide a device for insuring the discharge of a substantial quantity of oil upon the cylinder walls of an internal combustion engine as soon as the engine is set in operation.

Further objects of the invention will be seen from the following specification and accompanying drawings, referring to which:

Figure 4 is a plan view of one of the elements used in the construction of my filter, a portion of the elements being broken away for better illustration of other parts.

Figure 5 is a sectional view of the element shown in Figure 4 taken along the line 5—5 of Figure 4.

Figure 6 is an exploded side view showing the two parts of the spacer used in each of the filter elements.

Figure 7 is a sectional view in assembled relation of the parts shown in Figure 6.

Figure 8 is a large scale diagram showing the relation of the filtering elements to the separating material when the filter is not under pressure.

Figure 9 shows a diagram of the parts shown in Figure 8 in the position they assume when the filter is under pressure.

Figure 1:
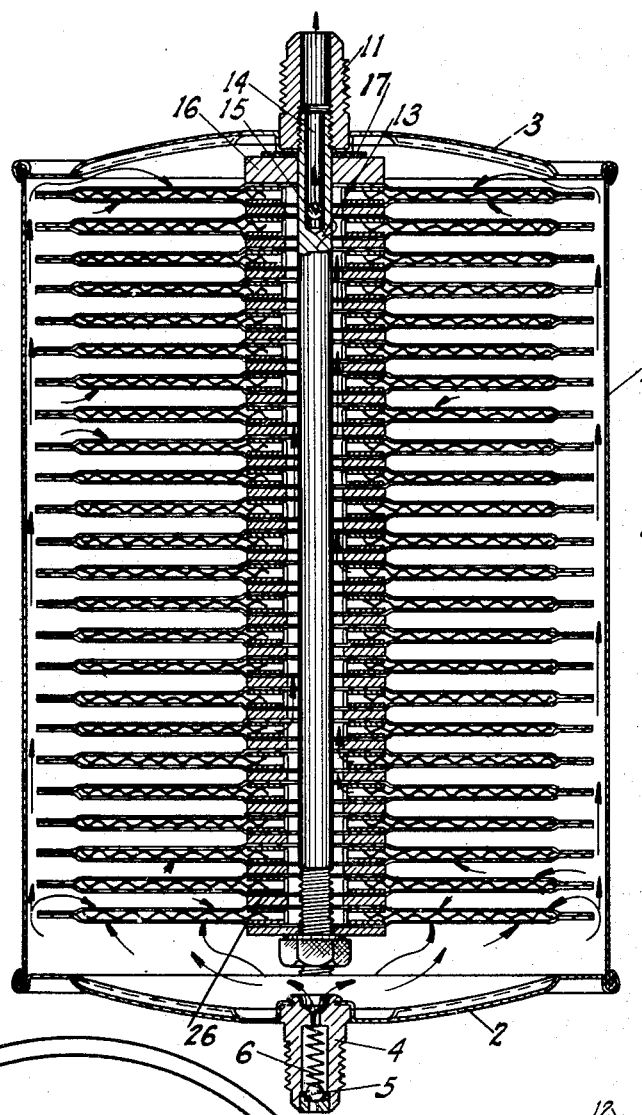
Figure 1 is a sectional elevation of a filter embodying my invention.
Figure 2:
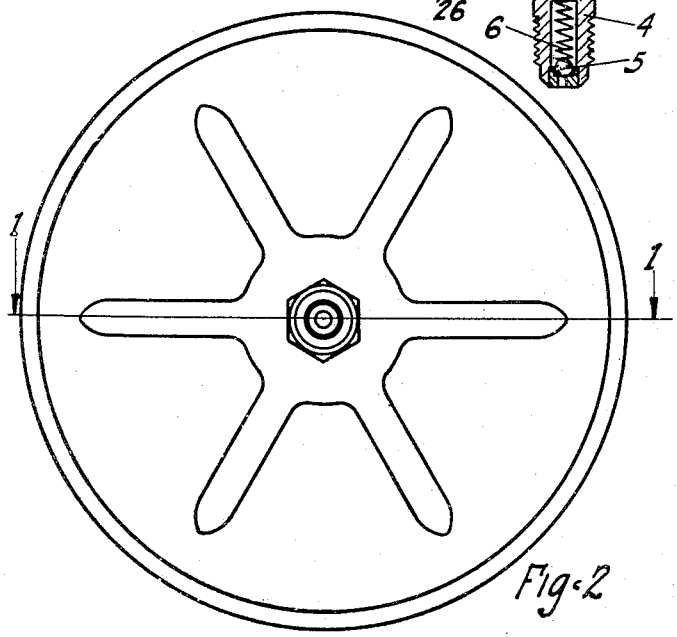
Figure 2 is an end view of the device shown in Figure 1.
Figure 3:
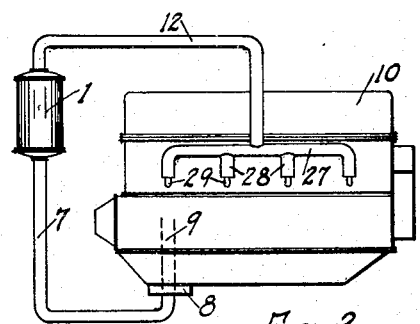
Figure 3 is a diagrammatic view showing the application of my filter to an internal combustion engine.

The reference numeral 1 indicates a casing of sheet metal or other suitable material having an inlet head 2 and an outlet head 3, also of sheet metal. At the inlet end of the filter, a fitting 4 having a spring pressed check valve 5, is provided. The valve is normally held in closed position by a light spring 6 which is displaceable by very low oil pressure to admit oil to the filter. The fitting 4 is connected to a conduit 7 leading from the usual oil pump 8 of an internal combustion engine. It will be understood that the pump is driven by the engine or any other suitable means, such as the shaft 9, the engine generally being indicated by the reference numeral 10. The outlet end of the filter is provided with a fitting 11 which is connected by means of a conduit 12 to a header 27 having branches 28 discharging at the interior surface of the cylinder walls. Suitable restrictions 29 may be provided at the outlets of the header for a purpose hereinafter to be described. The restrictions 29 are of such capacity as to be capable of passing the maximum constant discharge of oil through the filter without substantial resistance, but sufficiently small to insure the discharge of some oil from each of the outlets during the comparatively rapid primary discharge of the filter.

It will be understood that this filter may either be made large enough to pass the full flow of oil from the oil pump to the bearings, or it may be made smaller and used to filter only a small portion of the oil. In case the full flow type is used, suitable by-pass means may be provided to permit the oil to reach the bearings when the filter is so thoroughly clogged or so cold that the oil can not pass to the bearings in sufficient quantities, but this forms no part of the invention and is not shown.

A stem 13 is attached to the fitting 11 by screw threads or other suitable means, and the stem is formed with a longitudinal bore 14 and a cross bore 15 to permit the oil to flow into the fitting 11. A base plate or washer 16 surrounds the stem, as shown, and a gasket 17 is provided to prevent the leakage of oil around the stem and through the outlet end of the filter. The filter elements comprise sheets of paper 18 separated by a separating element 19 and spacing elements 20 and 21. The sheets of paper 18 are sewed together with a circular seam, as indicated at 30.

The separating element comprises a coarse mesh screen member 19. The member 20 is a plain circular washer, and the member 21 is provided with three upstanding lugs 23 having inturned portions 24 to form a supporting surface for the washer 20, and upturned portions 25 at the inner ends of the portions 24. The height of the flat surface 24 determines the spacing of the washers, and the upturned portions 25 are spread outwardly into the inner diameter of the washer to hold the washer 20 and member 21 in assembled relation. The spacing of these two members is so correlated with the thickness of the separating element 19 as to cause the spacing element to firmly grip the separating member to hold the threads of the weave in right angular relation to each other. This is for the purpose of permitting the rapid handling of the three elements 19, 20, and 21 after they have been assembled, but prior to their incorporation in the filtering element.

The filtering elements 18 are constructed as follows: Ordinary rag fibre filter paper is soaked in a solution of cellulose brushing lacquer and thinner. The lacquer, thin enough to be of the proper consistency for applying in the usual manner with a brush, is mixed with approximately nine times its volume of lacquer thinner. These proportions may be substantially varied in either direction. The purpose of applying the lacquer is to permeate and impregnate the fibres of the paper with a water proof substance, so that the tensile strength of the paper will be maintained, even when it is used with damp oil.

It will be understood that ordinary rag fibre filter paper is composed chiefly of cotton fibres. A small percentage of wool fibre is sometimes included but not in sufficient quantities to make the lacquer treatment unnecessary. It will be understood, of course, that the effect of moisture on the vegetable fibres is greater than its effect on wool. Wood and linen fibres are sometimes included in the filter paper as is well known to those skilled in the art and these are intended to be included in the term "vegetable fibres" as used in the claims.

A further purpose served by the application of the lacquer is the cementing together of the fibres of the paper, so that its tensile strength is increased and so that the fibres are made soft and resilient for a purpose hereinafter to be described. It will be understood that the thinning of the lacquer is done for the purpose of preventing the application of such a great volume thereof as to substantially fill the pores which would prevent the passage of oil through the filter and defeat its object altogether.

The filter elements are placed in a stack on the stem 13 and downwardly spacing washers 26 of any desired thickness are placed between the elements so that a substantial space for the accumulation of slime may be provided.

In operation, the engine 10 is frequently started and stopped pursuant to its normal operation, and the oil is introduced to the filter under pressure. This pressure deforms the filter elements to the position shown in Figure 9, causing expansion of the elements at the points indicated at A and causing compression at the points indicated at B. When the engine is stopped, the oil is retained in the filter by the check valve 5, preventing back flow of dirty oil to the pump, and the resilient filter elements gradually assume the position shown in Figure 8, at the same time discharging substantial quantities of oil through the individual elements. It will be understood that this oil is not discharged from the filter casing at this time, but when the engine is started again, oil enters the filter casing under pressure and compresses the filter elements again to the position shown in Figure 9, thus immediately causing a substantial discharge or clean oil from the filter casing, and this may occur without the passage of any oil through the individual filter elements at that time. The discharge of a quantity of oil from the filter to the cylinders is highly desirable at the time the engine is started and prevents the abrasion of the cylinder walls which might otherwise occur on account of lack of oil at starting.

The flexing of the filter elements serves another very important purpose in that it causes a constant kneading of the interior thereof and of the slime bed which collects on the outer surface. In this manner, I prevent the formation of the homogeneous slime bed upon which some prior filters have depended for success. Stated in different terms, I am enabled to produce and use a filter element in this way which may have a sufficiently fine texture at the outset to give proper filtration of the oil prior to the accumulation of any slime bed thereon, and the rate of flow through the filter does not increase as rapidly in operation as with other types on account of the constant kneading and breaking up of the slime bed or "cake" on the surface of the individual elements.

The application of pressure to a filter of this type takes place whenever the engine is started, and the pressure is gradually relieved when the engine is stopped. This should ordinarily provide sufficient flexing of the elements to break up the slime bed as it forms, but in installations where the periods of operation are comparatively long, it is desirable to omit the check valve at the inlet of the filter, so that at each increase and each reduction in the speed of the engine, some flexing of the filter element will occur, due to variations in oil pressure.

I claim:

1. A filter having a plurality of filter elements therein, each of said elements comprising one or more sheets of fibrous filtering material, the individual fibres of said material being impregnated with a water proof material, said waterproof material being applied in such small quantities as not to substantially increase the size of the individual fibres or to fill up the interstices between the fibres.

2. A filter casing having a plurality of filtering elements therein, said elements comprising one or more sheets of permanently flexible and resilient fibrous filter material, said material having substantially the same resiliency regardless of the presence or absence of moisture and means for supporting said sheets on the outlet side at a multiplicity of closely spaced points.

3. A filter casing having a plurality of filter elements therein, said elements comprising a pair of sheets of fibrous filtering material separated at a multiplicity of closely spaced points, said elements being made of vegetable fibre and so treated as to make them substantially water proof and permanently flexible and resilient, said sheets having substantially the same resiliency regardless of the presence or absence of moisture.

4. A filter comprising a casing having a plurality of filter elements therein, said elements comprising a pair of sheets of flexible and resilient fibrous material, said sheets having substantially the same resiliency regardless of the presence or absence of moisture, separating means contacting the adjacent sides of said sheets at spaced points, the peripheries of said sheets being in direct contact.

5. A filter comprising a casing having a plurality of filtering elements therein, said elements comprising a pair of sheets of resilient fibrous material, said sheets having substantially the same resiliency regardless of the presence or absence of moisture, separating and spacing elements mounted between said sheets, aligned perforations in said elements and spacing members, and a stem passing through said perforations for holding said elements in assembled relation.

6. A spacer for filtering elements comprising a perforated sheet metal member, a plurality of lugs extending upwardly from the periphery of said perforation, each of said lugs comprising an upturned portion, an inturned portion, and a second upturned portion, and a member of circular cross section having a perforation therein, said member resting on said inturned portions of said lugs and encircling said second upturned portions.

7. A spacer for filtering elements comprising a perforated sheet metal member, having a plurality of inwardly and upwardly extending lugs, each of said lugs comprising an upturned portion, an inturned portion, and a second upturned portion, an upper member of circular cross section having a perforation therein, said member resting on said inturned portions of said lugs, and said second upturned portions of said lugs firmly contacting the inner side of the perforation in the upper member.

8. In a device of the class described, a filter casing, a flexible and inherently resilient fine texture filter element therein, and spaced support for said element said element having substantially the same resiliency regardless of the presence or absence of moisture.

9. In a device of the class described, a filter casing, a flexible and inherently resilient fine texture filter element therein, and a multiplicity of closely spaced supports for said element, and means for repeatedly flexing said filter element, without changing the position of said element with respect to said casing.

10. In a device of the class described, a filter casing, a flexible and inherently resilient fine texture filter element therein, and a multiplicity of closely spaced supports for said element, said supports being located at points evenly distributed over the area of said element and means for repeatedly flexing said filter element without changing the position of said element with respect to said casing or removing it from contact with said supports, said means comprising means for varying the pressure at which the fluid to be filtered is supplied to said casing.

11. A filter for moisture containing lubricating oils comprising a casing, a filter element mounted in said casing, said element comprising a sheet of matted vegetable fibres treated with a solution of approximately 10% ordinary brushing lacquer, and 90% thinner.

12. In a filter, a casing, a filter element mounted in said casing, said filter element comprising a porous sheet of matted waterproofed vegetable fibres.

13. In a filter, a casing having an inlet and an outlet, a filter element mounted in said casing and separating said inlet from said outlet in such a manner as to prevent flow of fluid from the inlet to the outlet except by passing thru said element, said element comprising a porous sheet of matted waterproofed vegetable fibres.

14. In a filter, a casing having an inlet and an outlet, a filter element mounted in said casing and separating said inlet and said outlet, said filter element comprising a sheet of matted vegetable fibres treated with a highly diluted solution of lacquer and dried, the dilution of the lacquer solution being such that the interstices between the fibres of the filter element remain open and unobstructed after drying.

GEORGE R. ERICSON.